US007897857B2

(12) United States Patent
Lockwood

(10) Patent No.: US 7,897,857 B2
(45) Date of Patent: Mar. 1, 2011

(54) SELF-CORRECTIVE WRIST POSITIONING PRACTICE DEVICE

(76) Inventor: Aaron Lockwood, Bronx, NY (US)

( * ) Notice: Subject to any disclaimer, the term of this patent is extended or adjusted under 35 U.S.C. 154(b) by 0 days.

(21) Appl. No.: 12/653,593

(22) Filed: Dec. 16, 2009

(65) Prior Publication Data
US 2010/0224050 A1  Sep. 9, 2010

Related U.S. Application Data

(60) Provisional application No. 61/158,458, filed on Mar. 9, 2009, provisional application No. 61/247,563, filed on Oct. 1, 2009.

(51) Int. Cl.
G10D 1/08 (2006.01)
(52) U.S. Cl. ............................................. 84/280; 84/267
(58) Field of Classification Search .................... 84/267, 84/280, 281
See application file for complete search history.

(56) References Cited

U.S. PATENT DOCUMENTS

| 1,418,637 | A | | 6/1922 | Flood |
| 2,794,638 | A | | 6/1957 | Risher et al. |
| 3,036,831 | A | | 5/1962 | Engan |
| 3,606,342 | A | | 9/1971 | Albertson, Jr. |
| 3,726,176 | A | * | 4/1973 | Kaplan ........................ 84/47 R |
| 3,829,090 | A | | 8/1974 | Ensinger |
| 3,871,029 | A | | 3/1975 | Hollman |
| 4,040,632 | A | | 8/1977 | Pawl |
| 4,088,318 | A | | 5/1978 | Massman |
| 4,176,840 | A | | 12/1979 | Lanning |
| 4,502,688 | A | | 3/1985 | Papp |
| 4,941,460 | A | | 7/1990 | Working |
| 5,492,331 | A | | 2/1996 | Kawakami |
| 5,868,692 | A | | 2/1999 | Michniewicz |

* cited by examiner

Primary Examiner — Kimberly R Lockett
(74) Attorney, Agent, or Firm — Cheryl F. Cohen, LLC

(57) ABSTRACT

A self-corrective wrist positioning practice device including a planar elongated member having a two curved terminating ends with a pair of slots defined proximate each terminating end. Two adjustably securable straps are received within the pair of slots at the respective terminating ends. When oriented on the back of the wearer's arm the device permits while simultaneously mechanically signaling improper backward wrist bending without using electronic components. The device is also repositionable from the back to the side of the arm so as to signal improper bending of the wrist sideways.

17 Claims, 3 Drawing Sheets

100

SELF-CORRECTIVE WRIST POSITIONING PRACTICE DEVICE

CROSS-REFERENCE TO RELATED APPLICATIONS

This application claims the benefit of U.S. Provisional Application No. 61/158,458, filed Mar. 9, 2009, and U.S. Provisional Application No. 61/247,563, filed Oct. 1, 2009, each of which is herein incorporated by reference in their entirety.

BACKGROUND OF THE INVENTION

1. Field of the Invention

The present invention relates to a self-corrective practice or training device for signaling to the wearer when the wrist is improperly positioned. In one such application the wrist practice device may be used to signal improper positioning during playing of a stringed instrument such as a violin.

2. Description of Related Art

When playing a stringed instrument such as a violin, viola, cello or bass it is ideal to retain the wrist of the string-fingering hand so that the hand is substantially aligned with the forearm and wrist. Movement or bending backwards of the wrist hampers string fingering mobility and accuracy in intonation. During sessions with a teacher or instructor, the teacher or instructor may correct the user as to the proper positioning of the wrist. However, many hours of practice time are spent by a student during the learning of a stringed instrument at which time no teacher or instructor is present to correct for improper positioning of the wrist. Proper wrist positioning during such unobserved practice time is essential for future success in playing the stringed instrument.

U.S. Pat. No. 3,726,176 discloses an Apparatus for the Instruction of Hand Angulation in Playing Stringed Instruments. In accordance with the patented device, electronic circuitry is used to indicate to the wearer when the positioning of the wrist is incorrect. Such patented device, however, is expensive to manufacture and requires some type of power source (e.g., a battery) to operate which adds to the overall cost of the device as well as having to be replaced. Moreover, the cumbersome electrical conductors attached to the waist of the wearer hamper or interfere during playing of the instrument. Studies have consistently recognized numerous advantages in teaching a child to play a musical instrument at a very young age. The patented device due to its complexity in operation and stray wiring shouldn't be used by a young child without supervision by an adult.

It is therefore desirable to develop an inexpensive, self-corrective and easy to use mechanical device without employing any electronic components that may be used as a practice or training aid to be worn by the user of any age to signal improper positioning of the wrist without requiring adult supervision.

SUMMARY OF THE INVENTION

The present invention is to directed to an improved wrist practice or training device that is inexpensive, self-corrective, operable by any individual irrespective of age or mental capacity, eliminates the need for any electronics (circuitry, wires or power source), without requiring any assistance to position on the body or supervision by an adult.

The present invention is directed to a self-corrective wrist positioning practice device including a planar elongated member having two curved terminating ends with a pair of slots defined proximate each terminating end. Two adjustably securable straps are received within the pair of slots at the respective terminating ends. The device permits while simultaneously mechanically signaling via at least one of the curved terminating ends improper wrist bending without using electronic components. Furthermore, the device is repositionable between the back and side of the arm to signal improper backwards or sideways wrist bending depending on orientation of the planar elongated member on a back or side proximate a pinky finger, respectively, of an arm of a wearer.

In addition, the invention is directed to a method for using a self-corrective wrist positioning practice device in accordance with the preceding paragraph. Initially, the planar elongated member is positioned so as to be in contact with a back of wearer's arm starting from the back of the wearer's hand, extending over the back of the wearer's wrist and ending partially along the back of the wearer's forearm proximate but below the wrist. The first strap is arranged so that that it is disposed between a thumb and forefinger, thereafter the first strap is securely adjusted about a palm of the wearer, while the second strap is securely adjusted about the forearm of the wearer proximate but below the wrist while permitting backward wrist bending. Signaling of improper backward wrist bending is created by pressing at least one of the first curved terminating end of the planar elongated member into the back of the hand and the second curved terminating end of the planar elongated member into the back of the forearm proximate but below the wrist. The device is repositionable from the back of the arm to the side of the arm so as to signal improper sideways bending of the wrist.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

The present inventive wrist practice or training device may be used in a wide variety of different applications. For illustrative purposes only, the wrist practice device will be shown and described for training of proper straight positioning of the wrist while learning to play a violin. The wrist practice device may be used with other stringed instruments such as, but not limited to, the viola, cello and bass. Moreover, the wrist practice device may have other uses such as in sports, for example, signaling improper protonation/suppination while playing golf to develop a straighter shot.

Figure 1:
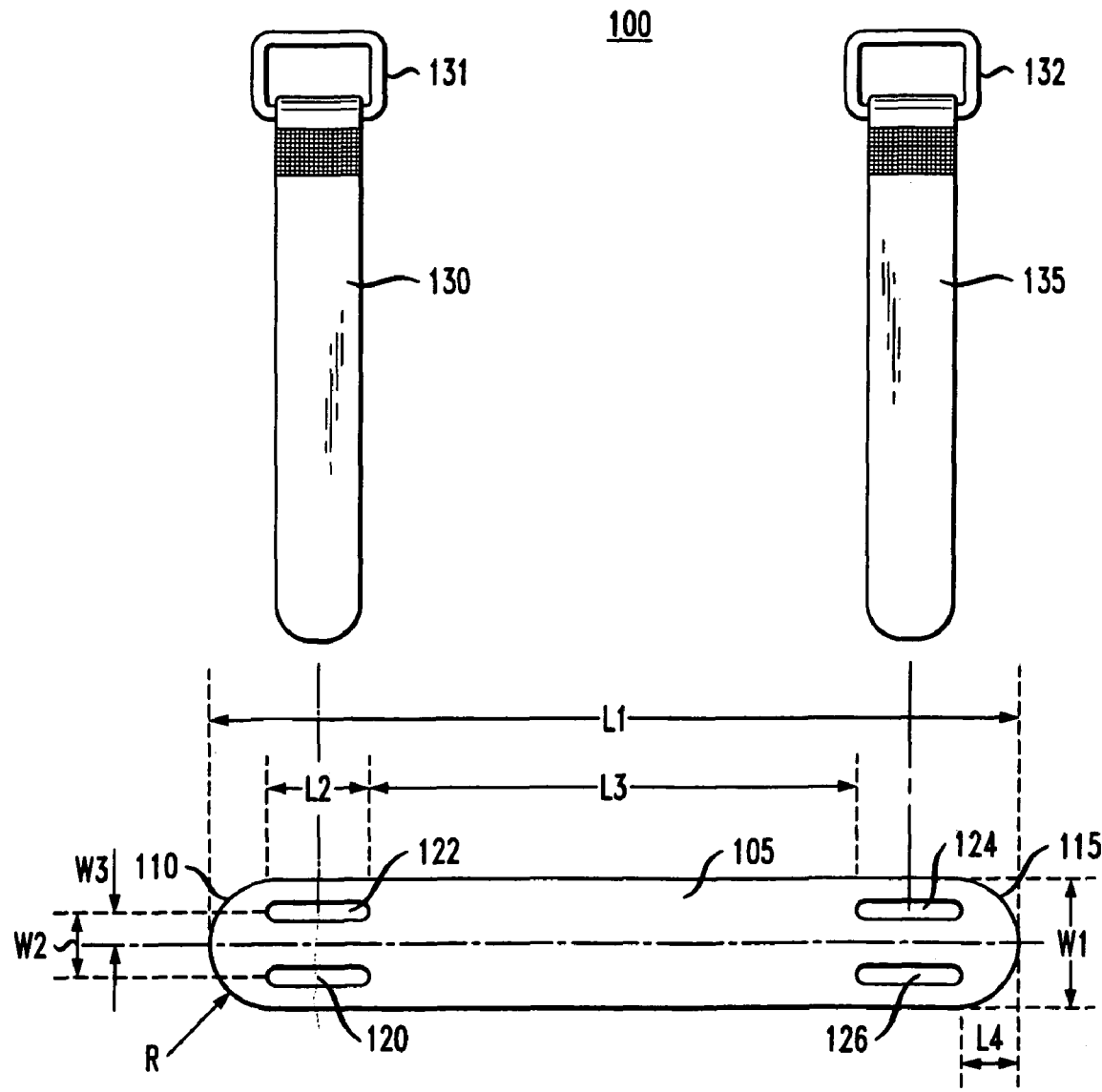
FIG. 1 is an exploded view of the wrist practice device in accordance with the present invention.

FIG. 1 is an exploded view of the wrist practice aid device 100 in accordance with the present invention. The device 100 includes a planar elongated member 105 having two opposing curved terminating ends 110, 115. Proximate each terminating end 110, 115 is a pair of substantially parallel slots 120, 122, 124, 126 defined therein. The slots are sized to receive therethrough a strap 130, 135. In a preferred embodiment, the slots are machined in the elongated member 105 so that the strap passes freely therethrough. Slots, slits, holes or any other shape aperture defined in the elongated member 105 rather than affixing a mechanical securing component such as rivets is preferred to achieve optimum signaling efficiency by resting the elongated member 105 flush or in direct contact with the back of the wearer's hand and forearm. The use of any type of mechanical securing component such as a rivet for affixing the strap to the elongated member would undesirably raise the elongated member from the back of the wearer's hand or forearm thereby reducing the signaling efficiency as well as imposing unwanted stress to the device making it prone to cracking. A pair of slots is preferred at each terminating end 110, 115 rather than a single slot once again to insure that the elongated member rests substantially flush against the back of the wearer's hand and forearm. Each strap 130, 135 includes a buckle 131, 132 and releasable securing means such as a hook-n-eye, Velcro™, snap, zipper, tie, clasp or any other releasable securing means. Preferably the type of releasable securing means used may be manipulated with a single hand so as not to require any assistance from another in securing the device to the wearer's hand.

Figure 3A:
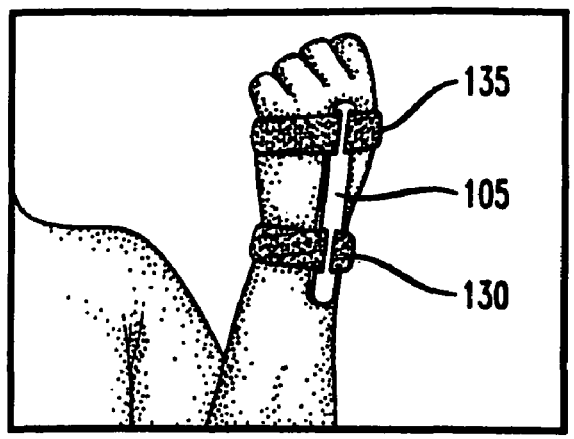
FIG. 3A shows the wrist practice device in accordance with the present invention oriented on the back of the wearer's hand and forearm while the wrist is straight.

As shown in FIG. 3A, the elongated member 105 is positioned so as to be substantially centered and supported on the back of the wearer's hand. Strap 135 is secured about the palm between the wearer's thumb and forefinger, while the other strap 130 is secured about the wearer's forearm proximate but below the wrist. The pair of slots 120, 122, 124, 126 at each respective terminating end 110, 115 of the elongated member 105 are preferably located at a length L4 from the respective closest terminating end between approximately 0.4 inch-approximately 0.6 inch, most preferably approximately 0.5 inch. This measurement L4 along with the total length L1 insures that when worn the device 100 will be properly positioned with one strap 135 about the wearer's palm, the other strap 130 about the wearer's forearm proximate but below the wrist.

Figure 3B:
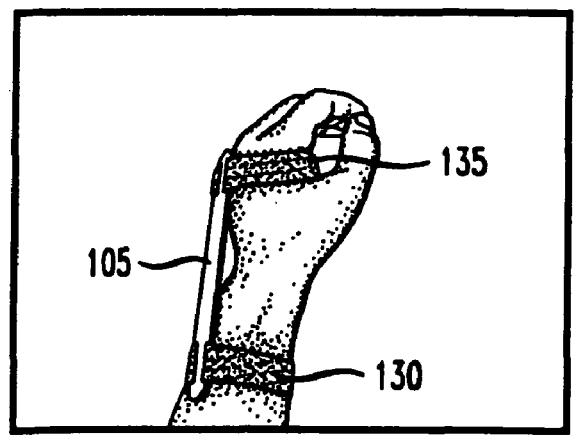
FIG. 3B shows the wrist practice device in accordance with the present invention oriented on the back of the wearer's hand and forearm while the wrist is bent backwards.

The dimensions of the wrist positioning practice device are selected so that when worn if the wrist of the wearer is positioned properly (i.e., straight) the terminating ends 110, 115 will not contact the back of the hand or forearm, as shown in FIG. 3A. In response to the wearer bending his/her wrist backwards, the terminating ends 110, 115 of the elongated member 105 will press into the back of the hand and forearm signaling to the wearer that the wrist is being held improperly, as shown in FIG. 3B. The wearer being alerted to the improper positioning of the wrist can make the appropriate correction, hence the self-correcting aspect of the invention. When the terminating ends 110, 115 of the elongated member 105 are no longer pressing into the back of the wearer's hand or forearm, proper positioning of the wrist has been achieved. To fully accomplish the aforementioned desired signaling effect, certain preferred dimensional limitations are imposed on the wrist positioning practice device 100.

Specifically, the overall length L1 of the elongated member 105 from one terminating end 110 to the other 115 is preferably in the range of approximately 4.50 inches-approximately 6.25 inches, most preferably approximately 5.875 inches for an adult. The curved terminating ends 110, 115 have a radius of curvature R preferably within the range of approximately 0.6 inch-approximately 0.8 inch, most preferably approximately 0.699 inch. Selection of the particular radius of curvature of the terminating ends 110, 115 takes into consideration several factors. Preferably any amount or angle of bending backwards of the wrist is considered or deemed improper and preferably signaled to the wearer when wearing the device. On the one hand, the smaller the radius of curvature of the terminating end the smaller the amount or angle of bending backwards of the wrist before being felt by the wearer. On the other hand, the larger the radius of curvature of the terminating end the larger the amount or angle of bending backwards of the wrist before being felt by the wearer. Another consideration when selecting the radius of curvature of the terminating ends 110, 115 is that improper bending of the wrist backwards should be readily felt by the wearer. The larger the radius of curvature the more subtle the feeling, whereas the smaller the radius of curvature the more acute the feeling when the terminating ends 110, 115 pushes into the back of the wearer's hand or forearm. Preferably the radius of curvature of the two terminating ends are equal. The width W1 of the elongated member 105 is preferably in the range of approximately 0.75 inch-approximately 1.25 inches, most preferably approximately 1.0 inch. In, selecting the width of the elongated member 105 for maximum comfort it is preferred that it not extend laterally outwards from the back of the hand or forearm so as to undesirably interfere or hamper with playing of the instrument. Another consideration is the width W1 required to achieve the desired rigidity/flexibility.

Each slot 120, 122, 124, 126 preferably is equal in length L2 so that universal width straps 130, 135 may be used for all slots. Preferably the length L2 of each slot 120, 122, 124, 126 is in the range of approximately 0.60 inch-approximately 0.65 inch, most preferably approximately 0.625 inches. It is noted that the slot length L2 can be selected, as desired, depending on the strap width. The width of each of the straps 130, 135 is preferably the same and preferably approximately equal to the length L2 of the slots 120, 122, 124, 126 so as to permit the straps to pass freely through the corresponding pair of slots. Yet another consideration when selecting the strap width is that the strap disposed about the palm between the thumb and forefinger not be too wide as to hamper or interfere with playing of the instrument when bending the palm. Preferably the pair of slots 120, 122, 124, 126 defined at each terminating end 110, 115 is substantially laterally centered in the elongated member 105. Moreover, the two slots at each terminating end are preferably separated from one another laterally as measured from the respective centers of each slot by a width W3 of preferably approximately 0.5 inch. The pair of slots at each terminating end are also preferably centered laterally in the elongated member 105.

The longitudinal distance L3 between corresponding slots on opposing terminating ends is preferably in a range between approximately 4.0 inches-approximately 3.5 inches, most preferably approximately 3.75 inches. Selection of the length L3 insures the proper location of the slots 120, 122, 124, 126 and respective straps 130, 135 received therein. If the pairs of slots on opposing terminating ends 110, 115 are disposed too far inward/outward longitudinally then the straps 130, 135 will not be positioned properly with one strap 135 disposed between the thumb and forefinger while the other strap 130 is disposed about the forearm proximate but below the wrist. For instance if the length L3 is too small then after positioning the strap 135 about the palm between the thumb and forefinger, the other strap 130 will be positioned above rather than below the wrist thereby defeating the overall goal of the invention, that is, detecting improper bending of the wrist.

Of the preferred dimensional ranges discussed above for the elongated member 105 and straps, only the lengths L1 and L3 vary depending on size of the individual wearer. As a general rule, in the case of a child, the lengths L1 and L3 are smaller than that for an adult. In particular, the range of length L1 for a child is approximately 4.0 inches-approximately 5.0 inches, most preferably 4.50 inches. The range of the length L3 is approximately 2.0 inches-approximately 2.5 inches, most preferably 2.0 inches. All other dimensions remain the same regardless of the size of the individual wearer (adult or a child). The releasable securing means together with the buckle 131, 132 allows the length of each strap 130, 135 to be adapted in size to accommodate the palm and forearm of any wearer.

Figure 4:
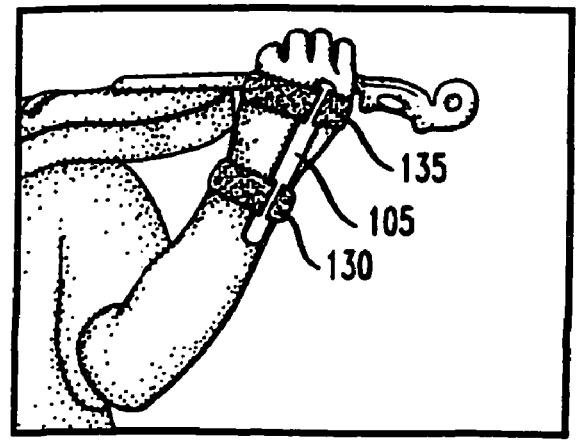
FIG. 4 depicts the wrist practice device oriented on the back of the wearer's hand and forearm while playing the violin.

In use, the self-corrective wrist practice device is adjustable to correct for two different positioning errors depending on its orientation on the wearer. Referring to the positioning of the wrist practice device in FIGS. 3A, 3B and 4, when the elongated member 105 is disposed substantially centered on the back of the wearer's hand and forearm it signals to the wearer the correct straight wrist position of the string-hand (typically the left-hand). Improper bending of the wrist of the string-hand backwards will prevent the fingers from efficiently reaching the fingerboard, and over time, may potentially cause carpal tunnel syndrome due to unnecessary stretching of the tendons of the string-hand. The present inventive wrist practice device signals to the wearer when the wrist is positioned backwards thereby preventing the establishment of improper positioning habits while practicing the instrument. Specifically, in response to the wearer improperly bending or moving his/her wrist backwards the terminating ends 110, 115 of the elongated member 105 press into the back of the wearer's hand and/or forearm signaling to the wearer to straighten his/her wrist, as depicted in FIG. 3B.

Figure 5A:
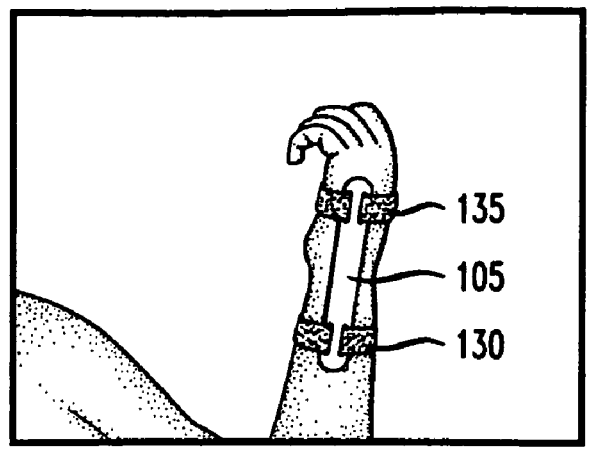
FIG. 5A depicts the wrist practice device in accordance with the present invention oriented on the side of the wearer's hand and forearm while the wrist is straight.
Figure 5B:
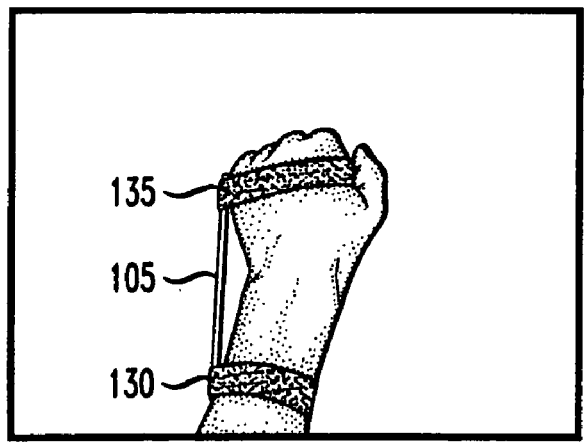
FIG. 5B depicts the wrist practice device in accordance with the present invention oriented on the side of the wearer's hand and forearm while the wrist is bent sideways.
Figure 6:
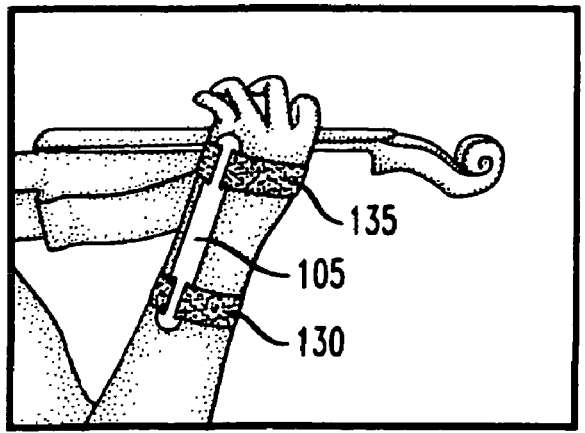
FIG. 6 depicts the wrist practice device oriented on the side of the wearer's hand and forearm while playing the violin.

By merely reorienting the wrist practice device on the wearer from the back to the side of the hand and forearm closest to the pinky finger (as shown in FIGS. 5A, 5B and 6) the wrist practice device may now be utilized in another corrective manner. It is a common mistake for students when shifting from $1^{st}$ to $3^{rd}$ position to reach for $3^{rd}$ position with the index finger causing the string-hand wrist to bend sideways. Orienting the wrist practice device to the side of the wearer's hand and forearm will signal to the user improper bending sideways of the wrist when the student is learning how to shift correctly from $1^{st}$ to $3^{rd}$ position. The positioning of the strap 135 between the thumb and forefinger about the palm, while the other strap 130 is positioned about the forearm below but proximate the wrist remains the same as that discussed above. Only the orientation of the elongated member 105 is adjusted so that instead of resting on the back of the user's arm, it is positioned to rest on the side of the arm proximate the pinky starting from the hand, extending over the wrist and along a portion of the forearm below but proximate the wrist. Similar to its operation when oriented on the back of the arm, when positioned to the side the terminating ends 110, 115 of the elongated member 105 press into the side of the hand and side of the forearm when the wrist is improperly bent sideways thereby signaling to the user improper positioning. When the wrist is positioned straight, the terminating ends 110, 115 of the elongated member 105 do not press into the side of the hand and forearm.

Figure 2:
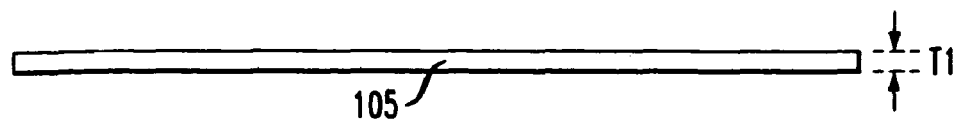
FIG. 2 is a side view of the elongated member of FIG. 1.

Elongated member 105 is made of a polymer material exhibiting both rigidity and flexibility. It is important for the elongated member 105 to be made of a material that despite exhibiting a certain degree of rigidity also permits some flexibility in that the purpose of the device is not to prohibit the user from bending their wrist backward, but instead to signal or alert the wearer to improper positioning when they are bending or moving their wrist. Signaling rather than prohibiting such improper movement is desired so that corrective action may be taken by the user to over time instill self-corrective proper wrist positioning. Several polymer materials may be employed such as acrylonitrile-butadiene-styrene (ABS), Delrin™ or Acrylic to provide the desired combination of rigidity and flexibility for achieving the intended self-corrective signaling feature. To provide the optimum rigidity and flexibility the elongated member 105 has a preferred thickness T1, as indicted in FIG. 2, of between approximately 0.125 inch-approximately 1.175 inch, most preferably approximately 0.125 inch.

One of the fundamental goals of effective wrist positioning practice device is to repeat the desired skills correctly again and again until the muscle memory becomes automatic. This is exactly what is accomplished through regular use of the present inventive self-correcting wrist positioning practice device.

Nothing extends longitudinally along the front of the forearm so that the wrist is permitted to flex and bend. The present invention is not designed to restrict, restrain, limit or reduce bending of the wrist in any way. Instead, the present invention is intended to signal to the wearer when improper positioning or bending of the wrist occurs, so that self-corrective action may be taken.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A self-corrective wrist positioning practice device comprising:
    a planar elongated member having a first curved terminating end and an opposite second curved terminating end, a pair of slots defined proximate each terminating end; and
    a first adjustably securable strap;
    a second adjustably securable strap;
    each of the first and second adjustably securable straps being receivable within a respective pair of slots at one of the terminating ends of the planar elongated member;
    wherein the device permits while simultaneously mechanically signaling via at least one of the curved terminating ends improper wrist bending without using electronic components.

2. The device in accordance with claim 1, wherein the planar elongated member is made of acrylonitrile-butadiene-styrene (ABS), acetal polymer or Acrylic.

3. The device in accordance with claim 2, wherein the planar elongated member has a thickness between approximately 0.125 inch-approximately 1.175 inch.

4. The device in accordance with claim 1, wherein a first length is defined longitudinally between the terminating ends of the planar elongated member, a second length is defined longitudinally between the pair of slots disposed at opposite terminating ends of the planar elongated member, and a third length is defined longitudinally between the pair of slots disposed at each terminating end of the planar elongated member and a respective closest terminating end; wherein the first and second lengths depend on an individual wearer's size, whereas the third length does not depend on the individual wearer's size.

5. The device in accordance with claim 4, wherein the first length is be approximately 4.50 inches and approximately 6.25 inches, the second length is between approximately 3.50 inches and approximately 4.0 inches, and the third length is between approximately 0.4 inch-approximately 0.6 inch; the first, second and third lengths insure that when worn one of the straps is disposed so as to be oriented about a wearer's palm, while the other strap is disposed so as to be oriented about the wearer's forearm proximate but below the wrist.

6. The device in accordance with claim 1, wherein the planar elongated member has substantially parallel longitudinal sides between the curved terminating ends.

7. The device in accordance with claim 6, wherein a width of the planar elongated member between the substantially parallel sides is between approximately 0.75 inch-approximately 1.25 inches.

8. The device in accordance with claim 1, wherein the device is adapted to signal improper backwards or sideways wrist bending depending on orientation of the planar elongated member on a back or side proximate a pinky finger, respectively, of an arm of a wearer.

9. A method of using a self-corrective wrist positioning practice device in accordance with claim 1, comprising the steps of:
   positioning the planar elongated member in contact with a back of wearer's arm starting from the back of the wearer's hand, extending over the back of the wearer's wrist and ending partially along the back of the wearer's forearm proximate but below the wrist;
   arranging the first strap so that that it is disposed between a thumb and forefinger;
   securely adjusting the first strap about a palm of the wearer and the second strap about the forearm of the wearer proximate but below the wrist while permitting backward wrist bending;
   signaling improper backward wrist bending, the signaling of backward wrist bending created by pressing at least one of the first curved terminating end of the planar elongated member into the back of the hand and the second curved terminating end of the planar elongated member into the back of the forearm proximate but below the wrist.

10. The method in accordance with claim 9, wherein the planar elongated member is made of acrylonitrile-butadiene-styrene (ABS), acetal polymer or Acrylic.

11. The method in accordance with claim 10, wherein the planar elongated member has a thickness between approximately 0.125 inch-approximately 1.175 inch.

12. The method in accordance with claim 9, wherein a first length is defined longitudinally between the terminating ends of the planar elongated member, a second length is defined longitudinally between the pair of slots disposed at opposite terminating ends of the planar elongated member, and a third length is defined longitudinally between the pair of slots disposed at each terminating end of the planar elongated member and a respective closest terminating end; wherein the first and second lengths depend on an individual wearer's size, whereas the third length does not depend on the individual wearer's size.

13. The method in accordance with claim 12, wherein the first length is between approximately 4.50 inches and approximately 6.25 inches, the second length is between approximately 3.50 inches and approximately 4.0 inches, and the third length is between approximately 0.4 inch-approximately 0.6 inch; the first, second and third lengths insure that when worn one of the straps is disposed so as to be oriented about a wearer's palm, while the other strap is disposed so as to be oriented about the wearer's forearm proximate but below the wrist.

14. The method in accordance with claim 9, wherein the planar elongated member has substantially parallel longitudinal sides between the curved terminating ends.

15. The method in accordance with claim 14, wherein a width of the planar elongated member between the substantially parallel sides is between approximately 0.75 inch-approximately 1.25 inches.

16. The method in accordance with claim 9, wherein the device is repositionable between the back of the arm and a side of the arm so as to signal improper backwards or sideways wrist bending depending on orientation of the planar elongated member on a back side proximate a pinky finger, respectively, of an arm of a wearer.

17. A method of using a self-corrective wrist positioning practice device in accordance with claim 1, comprising the steps of:
   positioning the planar elongated member in contact with a side of wearer's arm proximate a pinky finger starting from the side of the wearer's band, extending over the side of the wearer's wrist and ending partially along the side of the wearer's forearm proximate but below the wrist;
   arranging the first strap so that that it is disposed between a thumb and forefinger;
   securely adjusting the first strap about a palm of the wearer and the second strap about the forearm of the wearer proximate but below the wrist while permitting sideways wrist bending;
   signaling improper sideways wrist bending, the signaling of sideways wrist bending created by pressing at least one of the first curved terminating end of the planar elongated member into the side of the hand and the second curved terminating end of the planar elongated member into the side of the forearm proximate but below the wrist.

* * * * *